Oct. 16, 1923.
J. B. PELLETIER
FISHING REEL
Filed March 7, 1921
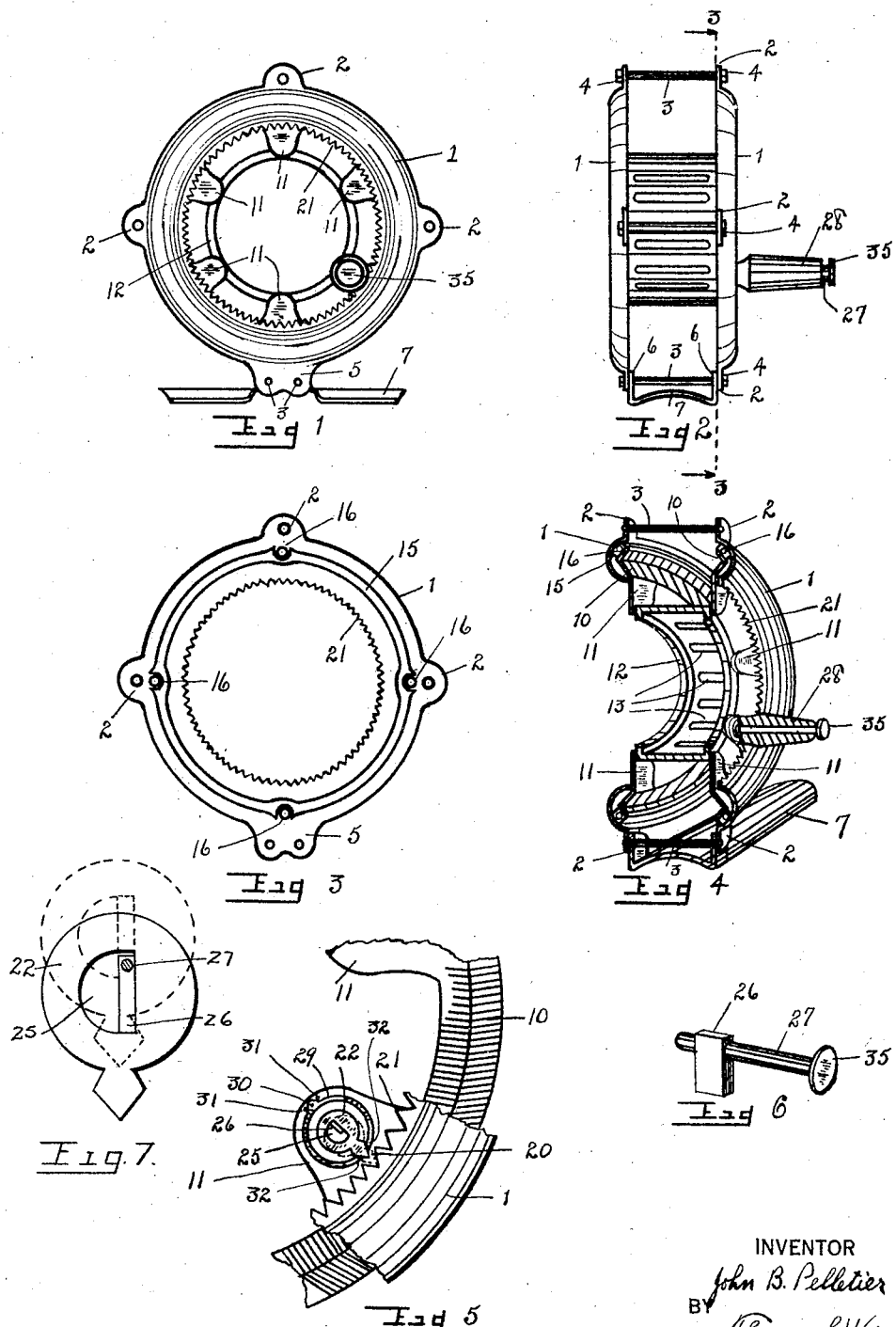
INVENTOR
John B. Pelletier
BY
Thomas L. Wilder
ATTORNEY Patented Oct. 16, 1923.

1,470,640

UNITED STATES PATENT OFFICE.

JOHN BARCLAY PELLETIER, OF OLD FORGE, NEW YORK.

FISHING REEL.

Application filed March 7, 1921. Serial No. 450,298.

*To all whom it may concern:*

Be it known that I, JOHN B. PELLETIER, a citizen of the United States, residing at Old Forge, in the county of Herkimer and State of New York, have invented certain new and useful Improvements in Fishing Reels, of which the following is a specification, reference being had therein to the accompanying drawing.

My invention relates to a fishing reel and I declare the following to be a full, clear, complete, concise and exact description thereof sufficient to enable anyone skilled in the art to which it appertains to make and use the same reference being had to the accompanying drawings in which like reference characters refer to like parts throughout the specification.

The object of the invention is to provide a fishing reel the parts of which can be easily assembled and that will employ balls to aid in reducing the friction of the rotary parts. Furthermore, the reel is constructed with the object in view of making the same light as possible and for admitting air to the interior parts, such as the drum or spool, whereby to aid in drying the fishing line wound on said drum. There is also convenient means for actuating the friction drag into and out of mesh with the corresponding gear teeth.

The object will be understood by referring to the drawings in which:

Fig. 1 is a side elevation of the fishing reel;

Fig. 2 is an end elevation of the fishing reel;

Fig. 3 is a section of the reel taken on line 3—3 of Fig. 2 and looking in the direction of the arrows there indicated;

Fig. 4 is a perspective view of one half of the reel, which has been cut through the center;

Fig. 5 is an enlarged detail view showing a fragment of certain parts on which is mounted the friction drag mechanism that is employed.

Fig. 6 is a perspective detail view somewhat enlarged, showing a cam and shaft employed.

Fig. 7 is a detail enlarged view of a circular shaped base member and tooth employed, showing the cam for actuating said member and the shaft in section, the limit of movement of said member and tooth being illustrated by dotted lines.

Referring more particularly to the drawings, the reel embodies the two annular casings 1, 1, which are formed also round in cross section. Each of these casings 1 is equipped with lugs or ears 2 provided with apertures for the assembling of connecting bars 3, which are reduced in diameter at their end portions and threaded for the mounting of nuts 4, whereby to hold the parts of the reel together.

The lower part of each of the casings 1 has also a double ear 5 with connecting bars 3 passing therethrough and through the upward extending lugs 6, 6 formed integral with the seat 7 that is curved in cross section to conform to the like curvature of the handle of a fishing rod, not shown, to which the reel is adapted to be attached.

Within each of the casings 1 is disposed the annular V shaped member 10 that has raidally inwardly extending ears 11. The line drum or spool 12 is connected by brazing or in any other suitable manner to the inner or free ends of said ears 11, whereby the center of the reel is left open for admission of air. The drum 12 itself is formed with an outer shell and left hollow in the center. The shell of the drum 12 is equipped with peripheral recesses 13 adapted to permit the air to reach the interior of the reel, whereby to dry the line wound on said drum 12.

The V shaped members 10 being located within the casings 1 are adapted to form a housing with the contiguous surface of the casing 1, in each instance, whereby to provide a housing or chamber for holding the ball retainers or spacers 15 containing the balls 16 in proper position. The balls 16 are adapted to aid in reducing the friction between the casings 1 and V shaped members 10 when said parts rotate relative to each others, as they do when winding or unwinding the line upon the drum 12.

The friction drag embodies a ratchet tooth 20 adapted to be moved into and out of mesh with the teeth 21 formed on the inner periphery of one of the annular casings 1. The tooth 20 is formed integral with the circular shaped base member 22 that is limited to move in one plane only by the free ends 32 of the annular spring 29 whereby the tooth 20 may be moved into and out of mesh with the teeth 21.

The means for thus actuating the tooth 20 embodies a cam recess 25 made in the base member 22 and a cam 26 adapted to move therein. Said cam 26 is of rectangular shape and formed integral with the shaft 27 that has a bearing at one end in the ear 11 and also in the handle 28 that is fastened to the base member 22.

The tooth 20 is located either in mesh or out of mesh with the teeth 21 by means of an annular spring 29 fastened by a screw 30 to the ear 11 and by the screws 31, 31, which steady said spring and hold it in proper position. The spring 29 is split. Its free ends 32, 32 engage the opposite sides of the tooth 20, as shown in full lines in Fig. 5, whereby to lock the tooth 20 out of mesh with the teeth 21. The dotted line position, shows the tooth 20 locked in mesh with said teeth 21. The free ends 32, 32 of the spring 29 yield sufficiently to permit the tooth 20 to escape thereby past, when actuated by the cam 26 of shaft 27.

The operation of the reel is effected by winding a fishing line, not here shown, on the drum 12 which my be rotated by the handle 28 and independently of the casings 1. Ordinarily the reel is first mounted on a fishing pole, which is not shown. After the line has been thus wound on the spool 12 to a sufficient length to suit the convenience of the fisherman, the friction drag may be applied by turning the head 35 of the shaft 27, whereby to rotate the cam 26 in its cam recess 25. This motion of the cam 26 will actuate the tooth 20 into mesh with the teeth 21. Obviously the friction drag may be released at any time by again turning the head 35 in the opposite direction.

Having thus described my invention what I claim as new and desire to secure by Letters Patent is:

1. In a fishing reel, an annular casing, teeth formed on the inner periphery of said annular casing, a drag for engaging said teeth, a drum located within said casing, a handle for turning said drum, a shaft carrying a cam journaled in said handle, and means for the rotation of said shaft, whereby to engage and release said friction drag.

2. In a fishing reel having annular casings, V shaped ball retaining members disposed within said casings, teeth formed on one of said annular casings, a tooth adapted to engage said first named teeth, whereby to form a friction drag, a rotary drum carried by said V shaped ball retaining members, a handle for rotating said drum, a shaft carrying a cam, whereby to operate said friction drag, and recesses in said drum, whereby to permit the air to reach the interior thereof.

In testimony whereof I have affixed my signature.

JOHN BARCLAY PELLETIER.

Witnesses:
 ORLEY C. TUTTLE,
 LEON R. ELDRIDGE.